May 14, 1968     H. L. LAUBE ET AL     3,383,495

HOT WATER HEATING SYSTEMS

Filed April 28, 1967     2 Sheets-Sheet 1

INVENTORS
Herbert L. Laube
John T. Bensley

WITNESS

BY

ATTORNEY

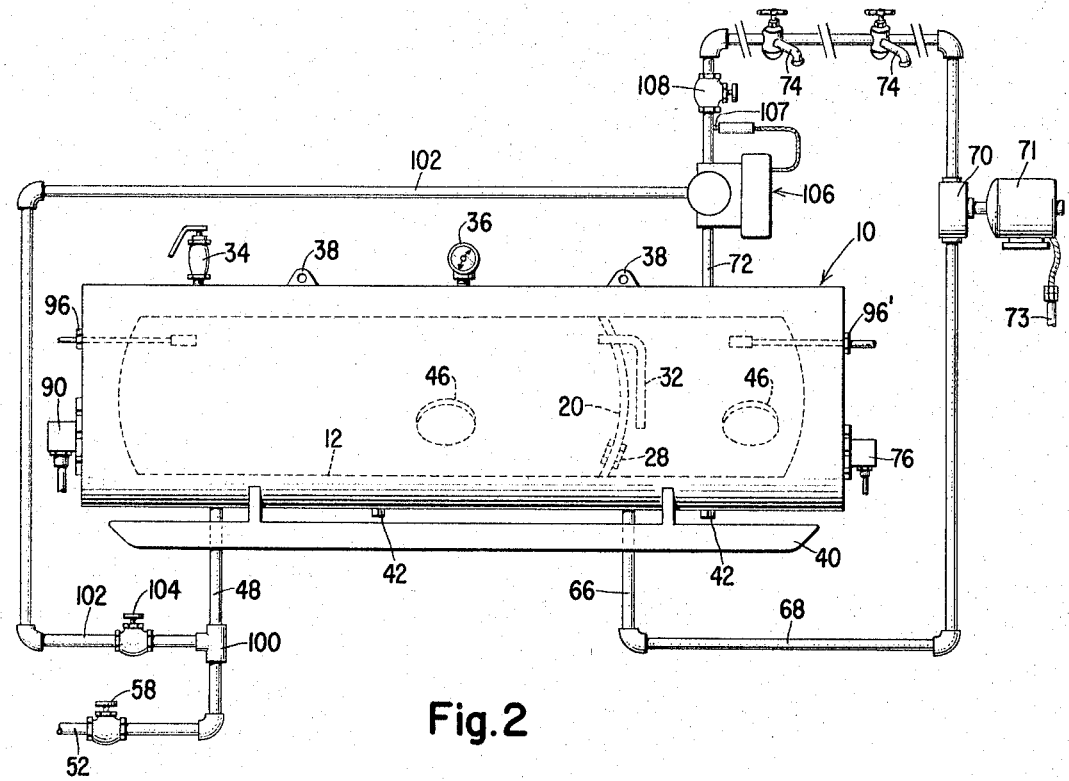
Fig.2
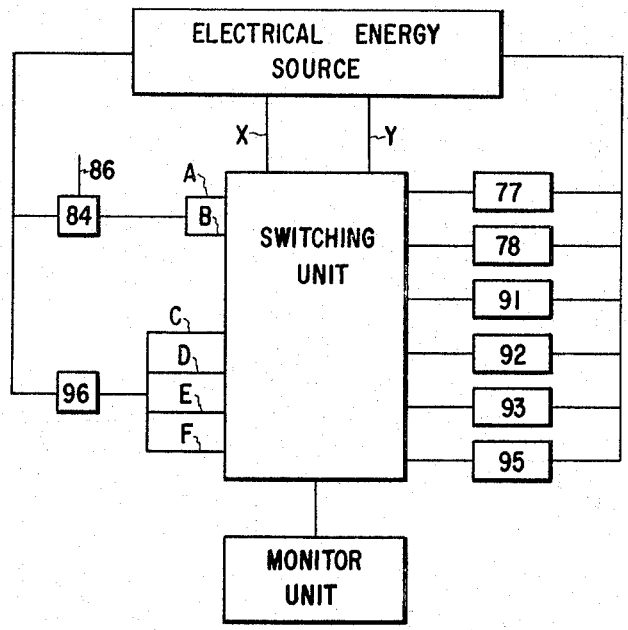
Fig.3
Fig.4
INVENTORS
Herbert L. Laube
John T. Bensley

United States Patent Office 3,383,495
Patented May 14, 1968

3,383,495
HOT WATER HEATING SYSTEMS
Herbert L. Laube, Camillus, and John T. Bensley,
Skaneateles, N.Y., assignors to The Singer Company, New York, N.Y., a corporation of New Jersey
Filed Apr. 28, 1967, Ser. No. 634,748
7 Claims. (Cl. 219—321)

ABSTRACT OF THE DISCLOSURE

An electrically powered hot water heating system that utilizes a unitary tank divided into two fluidly connected compartments, one substantially larger than the other. The large compartment contains water, drawn from a water supply and heated to a relatively high temperature, and the small compartment contains water at a relatively moderate temperature and from which the water is drawn to be delivered to service outlets, such as kitchen and bathroom faucets. The system, designed preferably for business establishments such as motels, includes a unit for controlling electric power supplied to such establishments which unit monitors and controls the electric energy supplied to the various electrically powered units such as the heaters for the two compartments.

Background of the invention

In some prior art electrically powered hot water heating systems relatively large tanks are utilized to store hot water heated to the maximum outlet temperature during off-peak electric power demand periods. This is preferably in the case of commercial establishments that use large amounts of electric power and are billed by the power company at a rate dependent upon the maximum power consumed during periods of peak power demand. The stored water thereby provides a reservoir of heated water which can be withdrawn during peak electric power demand periods when it is not desirable to add to the power then being consume by energizing the electrical heater elements for the tanks. However, because the water in such a system is drawn directly from the tank and is directed to such service outlets as bathroom and kitchen faucets there is a maximum temperature above which the water in the tank may not be heated for fear of scalling the users of such service outlets. Since the maximum tank water temperature is limited, in a tank of a given size, the maximum amount of B.t.u.'s that may be stored is limited by the maximum temperature. When it is necessary to increase the amount of B.t.u.'s, i.e., to increase the hot water reservoir, the size of the tank must be increased because the maximum temperature cannot be raised. The resultant increased size of the tank adds materially to the cost of such a system because larger size tanks are more expensive in initial cost and also because they occupy more space which in itself is costly. Furthermore, because the water in the tank begins to cool as soon as the electrical heaters are deenergized it is impossible to maintain a constant temperature at the service outlets. In addition, in such one-compartment hot water tanks, when sudden large demands are made upon the system and the water temperature drops beneath the temperature desired, it takes a relatively long time to raise the water temperature to the proper degree because all of the water in the tank must be heated to that temperature.

In certain prior art attempts to solve some of the problems set forth above, a system of valves and temperature sensing units and actuating devices responsive thereto were utilized to operate the valves to mix cold water with the hot water drawn from the tank to provide suitably moderated hot water for the service outlets. However, even with such a system of valves and controls, there still remains the problem of the relatively long recovery time required to heat all of the water in the tank when the water temperature drops below the degree desired.

Summary of the invention

The present invention comprises a system having a unitary tank divided into two fluidly connected compartments, one substantially larger than the other, the larger compartment containing water normally heated to a first relatively high temperature and the smaller compartment normally heated to a second lower, or moderately hot temperature. The water in both compartments is heated by electrically powered heaters that are immersed in the water in each compartment. The energization of the electrically powered heaters is controlled by thermostats that sense the water temperature in each compartment, in combination with an electronic control system that controls when and in what order the heaters may be energized.

The larger compartment is connected to a normally unheated water supply, and moderately hot water is drawn from the smaller compartment and directed to various service outlets, such as bathroom and kitchen faucets. The path of water flow is from the water source, through the large compartment, thence into the smaller compartment, and thence to the service outlets, with a return to the smaller compartment. During the interval when the control unit interrupts the flow of electrical energy to the heating elements in the tank, the smaller compartment receives hotter water from the larger compartment, and thus, the temperature of the water in the smaller compartment is maintained. However, if there is a sudden and large demand for hot water and the reservoir of hotter water in the large compartment is exhausted and the water temperature in the smaller compartment drops below the degree desired the heaters in the smaller compartment will, by priority, be energized ahead of the heaters in the larger compartment. This provides for a rapid return of the water temperature in the smaller compartment to the desired degree because of that compartment's relatively small capacity. Thus, the smaller compartment acts as a "quick recovery" compartment when the need arises, and thus solves the slow recovery problem which large single compartment tanks give rise to, as explained hereinbefore.

In addition, the use of a unitary single compartmentalized tank system, as compared with, for example, a system in which two separate tanks are used, makes more efficient use of available space and is less costly to manufacture and install.

It is an object of this invention to provide an improved electrically powered system for providing hot water for delivery to service outlets such as faucets in kitchens and bathrooms.

It is another object of this invention to provide an improved electrically powered hot water heating system utilizing an improved unitary compartmentalized tank.

Having in mind the above and other objects that will be evident from an understanding of this disclosure, the invention comprises the devices, combinations and arrangements of parts as illustrated in the presently preferred embodiments of the invention which is hereinafter set forth in such detail as to enable those skilled in the art readily to understand the function, operation, construction and advantages of it when made in conjunction with the accompanying drawings.

Brief description of the drawings

FIG. 2 is an elevational view illustrating another embodiment of the water heating system shown in FIG. 1.

FIG. 3 is a block diagram illustrating certain electrical and electronic components and elements utilized by the present invention.

FIG. 4 is a sectional view showing the partition illustrated in FIG. 1 equipped with a manhole cover.

Referring to FIG. 1, a tank 10 is formed with a unitary shell 12 coated on the inside with a layer preferably of alkali-resistant cement 14. A layer 16 of insulation encompasses the entire outer surface of the shell and is, in turn, encompassed by a metal jacket 18. A metal partition 20, also coated with the cement 14, divides the tank into two compartments, a large compartment 22 and a small compartment 24, preferably at a ratio of 4:1. The partition 20 may also be formed from a non-metallic material which would not require a coating of corrosion resistant material such as the cement 14. The partition 20 is formed with an aperture 26 near the bottom thereof in which is mounted a check valve 28 whose function is to equalize the pressure in both compartments when the tank is being filled initially to prevent buckling of the partition due to excess pressure on one side thereof. After the tank is filled the check valve 28 closes to prevent further flow through the partition at that point. Near the top of the partition 20 there is formed another aperture 30 in which is mouned a substantially L-shaped pipe 32 that extends into the small compartment 24 with the long leg of the pipe depending approximately half the distance to the bottom of the shell 12. The pipe 32 therefore provides for a constant fluid communication between the two compartments.

Figure 1:
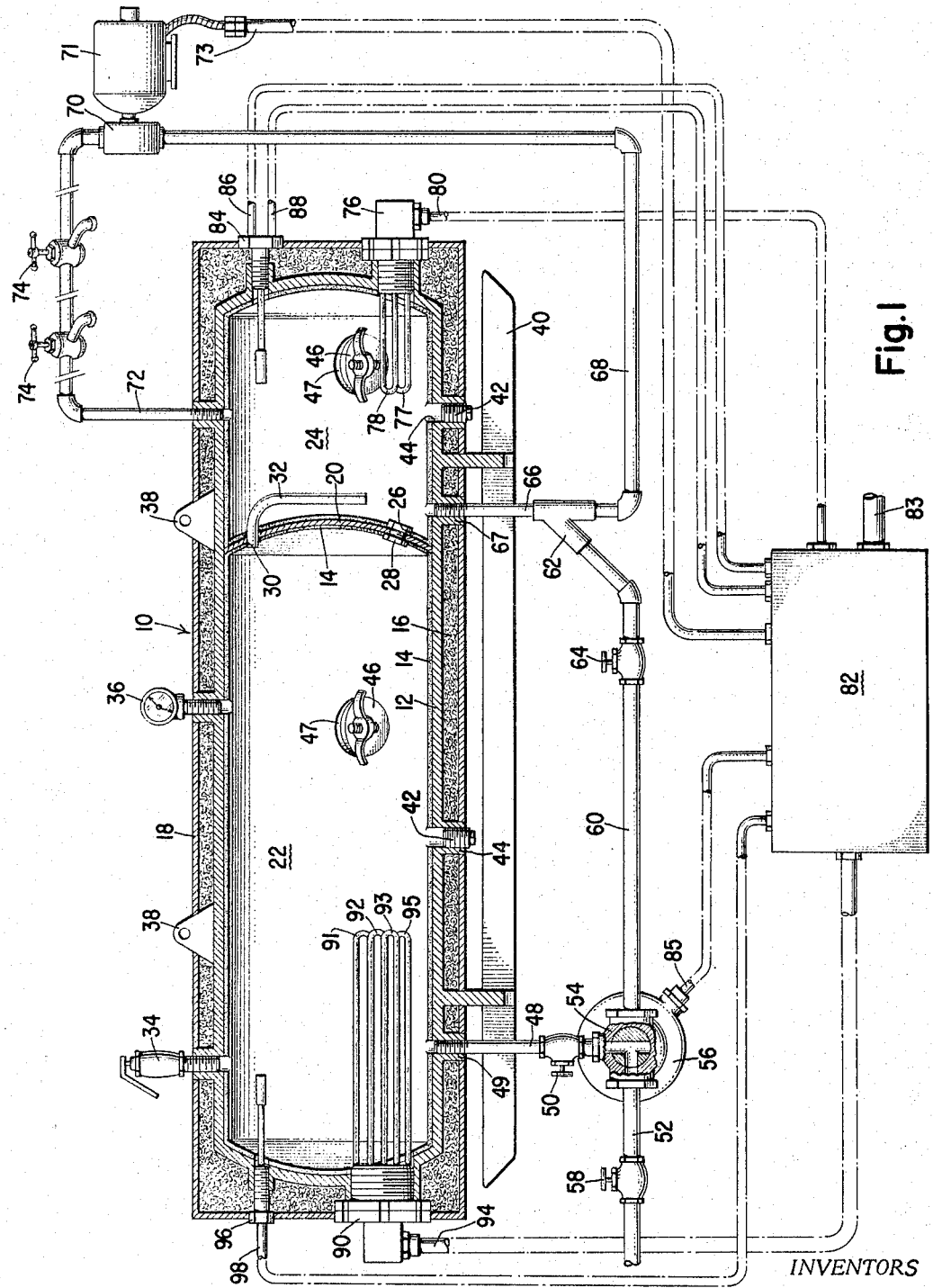
FIG. 1 is an elevational view, partially in section, of a water heating system that incorporates the present invention.

There is shown in FIG. 1 mounted in the top of the tank 10 a safety valve unit 34 which functions in the conventional manner to provide a quick pressure release in the event that the pressure within the large compartment 22 rises above a predetermined maximum level. Also mounted on the top of the tank 10 is a conventional pressure gauge unit 36 which registers the pressure within the large compartment 22. Protruding from the top of the tank 10 are a pair of spaced apertured flanges 38 secured to the shell 12 to provide a convenient means for lifting the tank during transportation and installation thereof. A support skid 40 is secured to the bottom of the shell 12 and provides a convenient, secure and sturdy support or stand for the tank 10. Mounted in the bottom of the tank 12 are a pair of threaded plugs 42 that engage each of a pair of threaded bosses 44, one for each compartment. The threaded plugs provide a convenient means for emptying the tank when it is so desired. Also mounted on the bottom of the tank 10 are a pair of manhole covers 46 which when opened allow access to the interior of the compartments through openings 47 in the tank for inspection and/or cleaning. As an alternative embodiment, illustrated in FIG. 4 an opening 49 is formed in the partition 20 and a manhole cover 51 is mounted thereon to provide access to the small compartment from the large compartment. In such an alternative embodiment the cover 51 and opening 49 which provide access to the small compartment directly from the outside of the tank would not be necessary.

A tank inlet pipe 48 is threaded into a boss 49 in the bottom of the tank 10 at the large compartment 22, a conventional manually operated on-off valve 50 being inserted in the inlet pipe 48 as shown in FIG. 1. The tank inlet pipe 48 is connected at its other end to a water supply pipe 52 through a three-way valve 54 which is operated by a motor 56. A conventional manually operated on-off valve 58 is inserted in the water supply pipe 52 between the water source (not shown) and the three-way valve 54. An intermediate pipe 60 is also connected to the three-way valve 54 and extends to a Y section 62 through a manually operated on-off valve 64. One leg of the Y section 62 is connected to a return pipe 66 which is threaded into a boss 67 in the bottom of the tank 10 at the small compartment 24. The remaining leg is connected to a pipe 68 which in turn is connected to the output side of circulating pump 70. A hot water outlet pipe 72 is fluidly connected to the top of the small compartment 24 and leads to various service outlets such as faucets 74, illustrated in FIG. 1. The circulating pump 70 provides a constant flow of water through the pipes from the hot water outlet at the top of the small compartment to the return at the bottom of the small compartment, thereby preventing the water in those pipes from cooling when no water is being drawn from the faucets. The pump 70 is placed on the return side of the service outlets to permit the pump to be of a smaller size than it would be if placed on the input side of the service outlets because it will not then be required to carry the water drawn at the service outlets.

Mounted on the small compartment end of the tank 10 and extending within the small compartment 23 is a flanged, removable immersion heater assembly 76 which includes two individual low density copper-sheathed heater elements 77 and 78 electrically connected by a conduit 80 to a central control box 82 shown separately at the bottom of FIG. 1. An electrical conduit 83 connects the central control box 82 to an electrical energy source. Also mounted on the small compartment end of the tank 10 is an immersion-type control thermostat 84, in this instance a dual action, two-contact thermostat. The two-contact thermostat 84 is electrically connected by conduits 86 and 88 to the central control box 82. The electrical conduit 86 provides for actuation of the motor 56, as explained hereinafter, which is connected to the central control box 82 through the electrical condiut 85.

The large compartment end of the tank has mounted thereon a flanged, removable immersion heater assembly 90 which includes four individual low density copper-sheathed heater elements 91, 92, 93 and 95 electrically connected by a conduit 94 to the central control box 82. Also mounted on the large compartment end of the tank 10 is an immersion-type control thermostat 96, which in this instance is a single action single contact thermostat. The thermostat 96 is electrically connected by a conduit 98 to the control box 82. The circulating pump 70 is driven by a motor 71 connected to the central control box 82 by an electrical conduit 73. It is noted that each of the two compartments is fitted with a dial-type immersion thermometer (not shown) to facilitate adjustment of the thermostats.

In the arrangement shown in FIG. 1 the temperature of the water in the large compartment 22 is normally kept at 200° F. and the temperature of the water in the small compartment 24 is normally kept at 140° F. Assume now that the tank is full and the temperatures are as stated above and that the three-way valve 54 provides a fluid connection between the water source and the large compartment as shown in FIG. 1. When water is drawn at the service outlets the path of the flow of the water is from the water source through the three-way valve into the large compartment 22, through the pipe 32, and into the small compartment 24 from which the water to the service outlets is drawn. If the outlet end of the pipe 32 was positioned close to the top of the small compartment, water drawn from the small compartment would often include slugs of the very hot water coming from the large compartment which would then find their way to the service outlets. This is undesirable because such service outlets include kitchen and bathroom faucets the temperature at the outlet of which should be about 140° F. The slugs of 200° F. water could very well scald the user; therefore the outlet end of the pipe 32 is positioned about half-way down in the small compartment to give the 200° F. water time to disperse in the 140° F. water before it is drawn out at the service outlets. However, sometimes the temperature in the small compartment rises too high making it more likely that very hot water will find its way to the service outlets. To rectify such an undesirable occurrence the two-contact thermostat 84 and the three-way valve 54 were included in the system. Thus, when the thermostat senses water temperature of a predetermined maximum degree the motor 56 for the valve 54 switches the valve thereby to cut off fluid communication between the cold water supply and the large compartment 22 and open fluid communication between the cold water supply and the small compartment 24. The influx of cold water will then reduce the water temperature in the small compartment to the desired degree whereupon the thermostat will function to return the three-way valve 54 to its initial position. It is noted at this point that if the water temperature in the large compartment is kept at, for example, 150° F. there would be no necessity for the above described mixing arrangement and the mixing arrangement disclosed in FIG. 2 (described below) because the positioning of the pipe 32 would be sufficient to disperse the 150° F. water, in addition to the fact that the 150° F. water is not that far above the desired temperature to cause any serious scalding problems. While the provision of the mixing apparatus adds to the cost of the system it does allow greater B.t.u. storage.

If when the tank was initially purchased by the user he did not wish to set the water temperature in the large compartment at 200° F. but did want to make provision for raising the temperature if his hot water demands changed, the following provisions can be made to accommodate him. Thus, the three-way valve 54 can be replaced by a simple elbow, the intermediate pipe 60 removed and the two contact thermostat 84 replaced by a single contact thermostat, such as the thermostat 96. The manually operable on-off valves 50, 58 and 64 make possible the installation of the intermediate pipe 60 and the three-way valve 54 without having to drain the tank.

Turning now to the embodiment disclosed in FIG. 2 there is disclosed a different mixing system for the same tank. In this embodiment a T-shaped section 100 is inserted in the water supply pipe 52 providing a continuous fluid communication between the cold water supply and the large compartment 22 of the tank 10 through two of the legs of the section 100. The other leg of the T-shaped section 100 is fluidly connected to a pipe 102 through a manually operable on-off valve 104. The other end of the pipe 102 is fluidly connected to a commercially available motor operated mixing or modulating valve unit 106. The mixing valve unit 106 is inserted in the hot water outlet pipe 72 and is connected by an electrical conduit (not shown) to the source of electrical energy. The mixing valve unit 106 utilizes an electrical bridge circuit which includes one leg 107 to sense the temperature of the water being directed through the pipe 72 to the service outlets and another leg to provide a reference point. The bridge circuit controls the temperature of the water being drawn by the service outlets by sensing changes in the outgoing water temperature and thereafter actuating the motor for the valve to allow the mixing of the cold water from the water supply with the hot water from the small compartment in whatever ratio is necessary to provide for the delivery of water of a predetermined temperature to the service outlets. A manually operable on-off valve 108 is inserted in the pipe 72 which, with the on-off valve 104, permits the convenient installation of the mixing apparatus as in the first embodiment where the purchaser initially purchased the tank without the mixing apparatus. It is noted that in the embodiment shown in FIG. 2 there is no need for a two-contact thermostat such as 84 in FIG. 1, therefore a single contact thermostat 96', which is the same as thermostat 96, is mounted on the small compartment end of the tank 10.

Turning now to the means for heating the water in the two compartments, which is the same in both of the embodiments described above reference may be made to FIGS. 1 and 3. As the hot water is drawn from the tank the temperature of the water in the large compartment 22 drops and the thermostat 96 is actuated. At this point the electronic apparatus which controls the distribution of electrical energy on a priority basis may override the thermostats. The electronic apparatus is shown in block form in FIG. 3 and is contained in central control box 82. It is noted that for purposes of simplification and clarity FIG. 1 only shows the electrical conduits from the heating system to the central control box 82 and not those other electrical conduits which connect the control box to other electrically powered units in the electrical system of the establishment utilizing the presently described heating system. For a more complete understanding of such electronic apparatus reference may be made to the pending application Ser. No. 458,687, filed May 25, 1965, Harry E. Wyman and John T. Bensley. Such electronic apparatus is utilized primarily by commercial establishments that consume large amounts of electrical energy. Such large users of electrical energy are billed by companies that sell the electrical energy at a rate that is determined in part by the maximum amount of electrical energy that is consumed in any one fifteen minute period during the course of the billing period. The higher that such a maximum reaches, the higher is the rate that is charged. Thus, it is to the purchaser's advantage to keep that maximum as low as possible. The electronic apparatus is programmed to keep the total amount of electrical energy consumed for any one fifteen minute period below a predetermined amount and when that amount is reached, to deactivate or prevent the actuation of electrically powered units in the electrical system of the commercial establishment on a predetermined priority basis, the electrical heating arrangement for the present heating system being one of such units. In addition, the electronic apparatus is also programmed to distinguish between the sets of heating elements in each of the compartments and give a priority to one such set, as explained hereinafter.

The electronic apparatus as shown in FIG. 3 includes a Monitor Unit which scans the overall electrical system in the commercial establishment to determine the amount of electrical energy being consumed at that time and how much is available below the predetermined maximum and in the light of such information to distribute the available electrical energy on a predetermined priority basis. The Monitor Unit operates various elements in the Switching Unit, which is connected to the Electrical Energy Source through electrical conduits X and Y, to distribute the electrical energy accordingly. FIG. 3 also shows the two contact thermostat 84 connected to an Electrical Energy Source and to the Switching Unit through two parallel leads A and B, each of which leads may be selectively connected to the corresponding heater elements 77 and 78 immersed in the water in the small compartment 24. In the same manner, the single contact thermostat 96 is connected to the Electrical Energy Source and to four parallel leads C, D, E, and F, each of which leads may be selectively connected to the corresponding heater elements 91, 92, 93, and 95 immersed in the water in the large compartment 22.

Returning now to the situation where the water temperature in the large compartment has lowered sufficiently to actuate the thermostat 96, the Monitor Unit then decides whether there is sufficient electrical energy available to connect leads C, D, E, and F to their corresponding heater units to energize the heater units. There may be no electrical energy available in which case none of the heaters 91, 92, 93, and 95 will be energized or there may only be sufficient electrical energy to energize one or more of the heaters. If there is no electrical energy available or just enough to energize one or more heaters the thermostat will remain actuated so that as soon as electrical energy is available (unless that energized heater or heaters heats the water sufficiently to open the thermostats) the remaining heater or heaters will be energized.

As explained above, in one form of the invention, the water in the large compartment 22 is left at, for example, 150° F., while the water in the small compartment 24 is left at 140° F. Thus, since water flows from the large to the small compartment the influx of the hotter water tends to keep the water in the small compartment at the desired 140° F. However, in the event that there is a sudden heavy demand at the service outlets sufficient to drop the water temperature in the small compartment below the desired 140° F., the proper contact of the two contact thermostat 84 closes and the heater elements 77 and 78 will be actuated if the Monitor Unit decides that there is sufficient electrical energy available for the hot water heater elements. If, in addition to thermostat 84, thermostat 96 is actuated because of a drop in water temperature in the large compartment the Monitor Unit is programmed to give priority to the heater elements in the small or quick recovery compartment. Thus, providing that there is electrical energy available based on the position of priority of the electric heaters 77 and 78 in the electrical system as a whole, the water in the small compartment 24 will be brought back to the desired temperature before the water in the large compartment. This provision assists the heating system in providing the service outlets with water at the desired 140° F. temperature as much of the time as is possible under the predetermined priority program.

In the embodiments that utilize a very high water temperature in the large compartment, for example, 200° F., the above described priority is still applicable. The difference in such systems, as explained above, is that it is preferable to utilize a mixing system at the outlet of the small compartment or within the small compartment to obviate the possibility of slugs of very high temperature water from being drawn at the service outlets.

Having thus set forth the nature of this invention, what is claimed herein is:

1. In a system for providing hot water for delivery to service outlets such as faucets in kitchens and bathrooms, a unitary tank, a partition mounted in said tank, said partition forming a first compartment and a second compartment in said tank, said second compartment being substantially larger than said first compartment, said partition having an aperture formed therein fluidly connecting said first and second compartments, means for fluidly connecting said second compartment to a source of unheated water, means for fluidly connecting said first compartment to said service outlets, means for delivering water to said service outlets directly from said first compartment, the water in said first compartment being supplied from said second compartment, electrically powered means in said first and second compartments for heating water therein, thermostat means actuated in response to water temperature in said compartments to prepare a circuit which supplies power to said electrically powered means, said thermostat means being adjusted so that the temperature of the water in said second compartment is maintained at a higher temperature than is the water in said first compartment, means for controlling the distribution of electrical energy on a priority basis in an electrical system to which said electrically powered means is connected, said means for controlling the distribution of electrical energy including means for preventing the energization of said electrically powered means when said thermostat means is actuated and the total amount of electrical energy drawn by the higher priority electrical circuits in said electrical system is at a predetermined maximum level.

2. A system as set forth in claim 1 wherein said electrically powered means includes at least one electric heater element in each of said compartments and said means for controlling the distribution of said electrical energy includes means for giving priority to the at least one heater element in said first compartment relatively to said at least one heater element in said second compartment.

3. A system as set forth in claim 2 wherein said tank includes a unitary shell, said partition being mounted within said unitary shell dividing said shell into said first and second compartments, a metal jacket surrounding said unitary shell, a layer of heat insulating material sandwiched between said shell and said metal jacket, a coating of corrosion resistant material on the entire inner surface of said shell, two manhole cover means for providing access to said first and second compartments, a pressure gauge unit mounted on said tank and a removable plug mounted beneath each of said compartments to permit the water to be drained from said compartments.

4. A system as set forth in claim 2 including means for mixing water from said unheated water source with the first compartment water before the first compartment water reaches the service outlets, and thermostat means for actuating said mixing means when said first compartment water reaches a predetermined high temperature.

5. A tank for a system for providing hot water for delivery to service outlets such as faucets in kitchens and bathrooms, comprising a unitary shell, an apertured partition mounted within said shell, said partition forming a first and second compartment in said shell, said second compartment being substantially larger than said first compartment, said partition having formed therein an aperture fluidly connecting said first and second compartments, said second compartment having formed therein an opening for fluidly connecting said second compartment to an unheated water source, said first compartment having formed therein an output opening for fluidly connecting said first compartment to the service outlets, said first compartment having formed therein an input opening for fluidly connecting said first compartment to the return from said output opening from the service outlets, said aperture in said partition being located in the top section of said tank, said partition having mounted therein adjacent the bottom of said tank check valve means for preventing unequal pressures from being generated in said compartments as the tank is filled initially and to prevent recirculation thereafter, and means for mounting electric water heaters in each of said compartments.

6. A tank as set forth in claim 5 wherein said unitary shell is entirely surrounded by a layer of insulating material, and including a metal jacket formed to encompass said layer of insulating material, and wherein the entire inner surface of said shell is coated with a layer of corrosion resistant material.

7. A tank as set forth in claim 6 including two manhole covers for said tank, one of said covers providing access to said larger compartent through a manhole opening formed in said tank and one of said covers providing access to said smaller compartment from said larger compartment through a manhole opening formed in said partition for providing for inspection of said compartments, plug means mounted in the bottom of each compartment of said tank for draining each of said compartments, a pair of apertured flanges affixed to the top of said tank to which flanges may be connected elements utilized to lift the tank, and skid means affixed to the bottom of said tank for supporting said tank.

References Cited
UNITED STATES PATENTS

| | | | |
|---|---|---|---|
| 2,386,949 | 10/1945 | Hayward | 219—314 |
| 2,538,586 | 1/1951 | Oldham | 219—314 X |
| 2,742,560 | 4/1956 | Liebhafsky | 219—330 X |
| 2,756,739 | 7/1956 | Schaub. | |
| 2,834,865 | 5/1968 | Coates | 219—314 |

FOREIGN PATENTS 622,931 12/1935 Germany.

ANTHONY BARTIS, *Primary Examiner.*